(12) United States Patent
Mayblum et al.

(10) Patent No.: US 9,106,960 B2
(45) Date of Patent: Aug. 11, 2015

(54) REDUCING MEDIA CONTENT SIZE FOR TRANSMISSION OVER A NETWORK

(71) Applicant: CELLCO PARTNERSHIP, Basking Ridge, NJ (US)

(72) Inventors: Amir Mayblum, Walnut Creek, CA (US); Lutz Ehrlich, New Hope, PA (US); Jerry M. Kupsh, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 146 days.

(21) Appl. No.: 13/843,047

(22) Filed: Mar. 15, 2013

(65) Prior Publication Data

US 2014/0270709 A1     Sep. 18, 2014

(51) Int. Cl.
| | |
|---|---|
| G06F 3/00 | (2006.01) |
| H04N 21/472 | (2011.01) |
| G11B 27/031 | (2006.01) |
| H04N 21/414 | (2011.01) |
| H04N 21/4788 | (2011.01) |

(52) U.S. Cl.
CPC ........ H04N 21/47205 (2013.01); G11B 27/031 (2013.01); H04N 21/41407 (2013.01); H04N 21/4788 (2013.01)

(58) Field of Classification Search
CPC ..... G06F 3/0481; G06F 3/04883; G06F 8/34; G11B 27/34

USPC .............. 715/723, 763, 772, 863; 725/93; 386/278

See application file for complete search history.

(56) References Cited

U.S. PATENT DOCUMENTS

| | | | |
|---|---|---|---|
| 2003/0055844 A1* | 3/2003 | Rudd et al. ............... | 707/200 |
| 2006/0005135 A1* | 1/2006 | Vetelainen ................ | 715/723 |
| 2009/0150947 A1* | 6/2009 | Soderstrom .............. | 725/93 |
| 2010/0107104 A1* | 4/2010 | Bruce et al. .............. | 715/772 |
| 2010/0235746 A1* | 9/2010 | Anzures ................... | 715/723 |
| 2012/0137237 A1* | 5/2012 | Brenner et al. ........... | 715/763 |

* cited by examiner

*Primary Examiner* — Thai Tran
*Assistant Examiner* — Mishawn Dunn

(57) ABSTRACT

A device receives an indication that a user of the device wishes to share media content with another user. The device identifies a size associated with the media content and an acceptable media content size for successful transmission over a communication network. The size associated with the media content is compared with the acceptable media content size to determine whether the size associated with the media content exceeds the acceptable media content size. Upon determining that the size associated with the media content exceeds the acceptable media content size, the device enables the user of the device to reduce the size of the media content to the acceptable media content size. The user is enabled to graphically determine when the media content is reduced to the acceptable media content size.

16 Claims, 5 Drawing Sheets

REDUCING MEDIA CONTENT SIZE FOR TRANSMISSION OVER A NETWORK

BACKGROUND

The mobile phones have evolved and offer, among other capabilities, a capability to capture high resolution media content (e.g., video content). The captured video may need to be transferred from one mobile device to another mobile device. However, such transfer may not be possible if the captured video has a size larger than an acceptable video size permitted by the mobile device and/or mobile communication network. If the size associated with the captured video is larger than the acceptable video size, the transfer of the video over the communication network will likely fail. With the current implementation, the user may be prompted with an error code informing the user that the transmission of the video was not successful.

Hence, a need exists for a method to allow the users to transfer video content that is larger than the acceptable content size without receiving an error message. Specifically, a need exists for a method for determining if the video content exceeds an acceptable content size and enabling a user to reduce the size of the video content and select the appropriate video length based on the acceptable content size prior to sending the video content over the communication network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples described herein relate to a process that may be included on a device to allow the user of the device to edit and later compress media content to an acceptable size so that the media content can successfully be sent across the mobile communication network. The media content may include video content; however, the media content may also include other media content such as audio content. In the following description, it is assumed that the media content includes video content. The process is automatically triggered when the user of the device wants to share video content with another user over a communication network. The size of the video content is compared with an acceptable media content size for successful transmission over a mobile communication network. If the size of the video content exceeds the acceptable media content size, the process allows the user of the mobile device to trim the video content down to the acceptable media content size. The process allows the user to graphically determine when the video content is trimmed down to the acceptable media content size.

Figure 1:
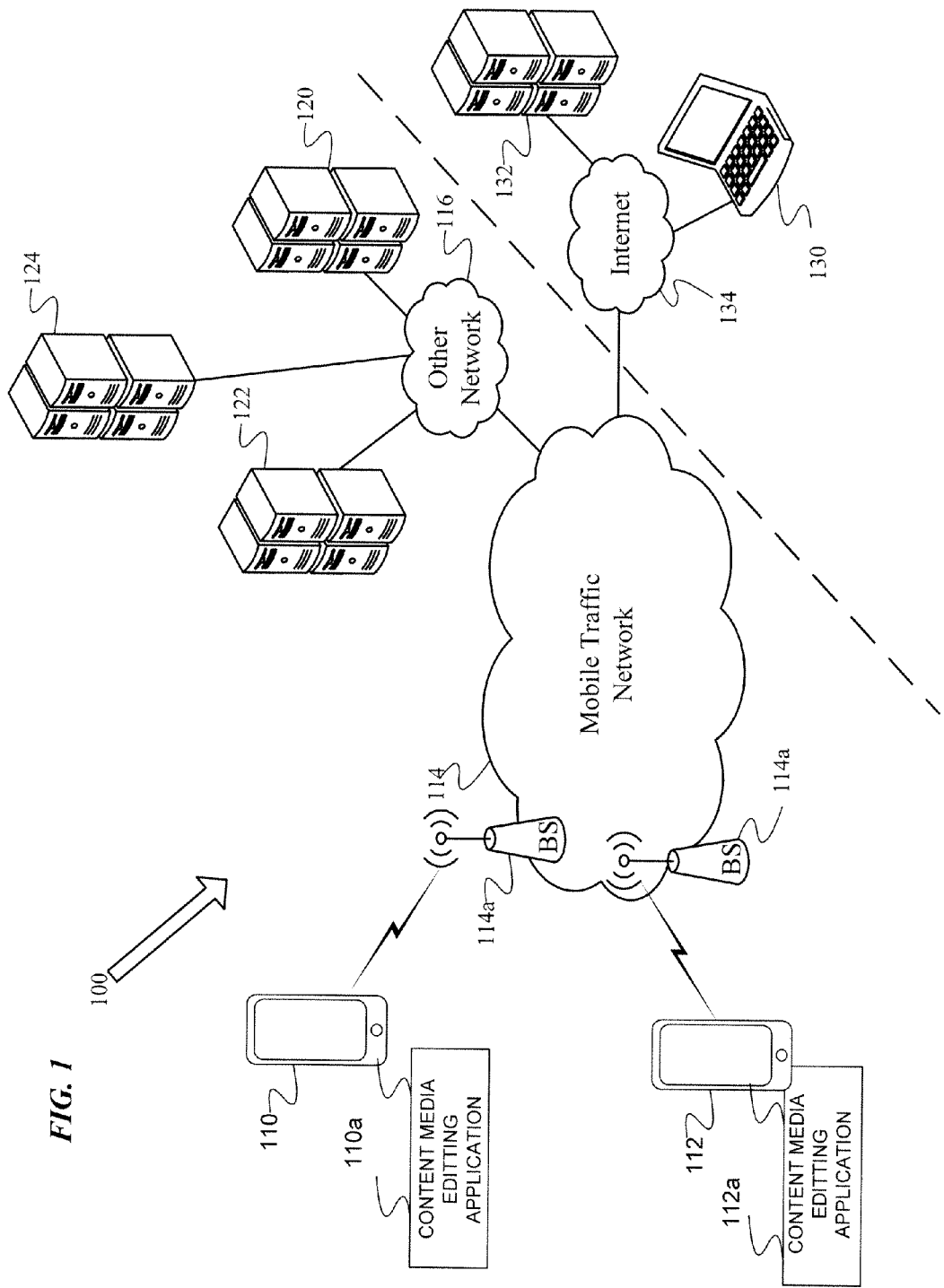
FIG. 1 illustrates an exemplary system allowing users to exchange media content among their respective devices.

Reference now is made in detail to the examples illustrated in the accompanying drawings and discussed below. FIG. 1 illustrates an exemplary system 100 allowing users to exchange media content among their respective devices. The system 100 includes mobile devices 110 and 112 connected to servers 120 and 122 via networks 114 and 116. The system 100 also includes a personal computer (PC) 130 and a server 132 in communication with mobile devices 110 and 112 over the network 114 and the Internet 134.

The mobile devices 110 and 112 are examples of mobile devices that may be used for sharing media content across the mobile communication network 114. However, the network 114 will provide similar communications for other mobile devices/users. The network 114 provides mobile wireless communications services to the mobile devices 110 and 112 as well as to other mobile devices (not shown), for example, via a number of base stations (BSs) 114a. The present techniques may be implemented in any type of mobile device compatible with such a network 114, and the drawing shows only a very simplified example of a few relevant elements of the network 114 for purposes of discussion here.

The wireless mobile communication network 114 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications such as Long Term Evolution (LTE) and Wi-Fi networks. The mobile devices 110 and 112 are capable of voice telephone communications through the network 114. The mobile devices 110 and 112 are also capable of data communications through the particular type of network 114 (and the users thereof typically will have subscribed to data service through the network).

The network 114 typically offers a variety of data services via the Internet 134, such as downloads, web browsing, email, etc. By way of example, the drawing shows a laptop PC type user terminal 130 as well as a server 132 connected to the Internet 134; and the data services for the mobile devices 110 and 112 via the Internet 134 may be with devices like those shown at 130 and 132 as well as with a variety of other types of devices or systems capable of data communications through various interconnected networks. The mobile devices 110 and 112 also can respectively receive and execute media content editing applications 110a and 112a written in various programming languages, as discussed more later.

Mobile devices 110 and 112 can take the form of portable handsets, smartphones or personal digital assistants, although they may be implemented in other form factors. Program applications, including the media content editing applications 110a and 112a to assist in trimming down media content to an acceptable content size before attempting to deliver the media content across the network 114 can be configured to execute on many different types of mobile devices 13. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system. Furthermore, the editing application 110a may be installed on other type of devices such as PC and laptops.

The mobile communication network 100 can be implemented by a number of interconnected networks. Hence, the overall network 100 may include a number of radio access networks (RANs), as well as regional ground networks interconnecting a number of RANs and a wide area network (WAN) interconnecting the regional ground networks to core network elements. A regional portion of the network 100, such as that serving mobile devices 110 and 112, can include one or more RANs and a regional circuit and/or packet switched network and associated signaling network facilities.

Physical elements of a RAN operated by one of the mobile service providers or carriers, include a number of base stations represented in the example by the BSs 114a. Although not separately shown, such a BS 114a can include a base transceiver system (BTS), which can communicate via an antennae system at the site of base station and over the airlink with one or more of the mobile devices 110 and 112, when the mobile devices are within range. Each base station can include a BTS coupled to several antennae mounted on a radio tower within a coverage area often referred to as a "cell." The BTS is the part of the radio network that sends and receives RF signals to/from the mobile devices 110 and 112 that are served by the BS 114a.

The radio access networks can also include a traffic network represented generally by the cloud at 114, which carries the user communications and data for the mobile devices 110 and 112 between the BS 114a and other elements with or through which the mobile devices communicate. The network can also include other elements that support functionality other than device-to-device media transfer services such as messaging service messages and voice communications. Specific elements of the network 114 for carrying the voice and data traffic and for controlling various aspects of the calls or sessions through the network 114 are omitted here form simplicity. It will be understood that the various network elements can communicate with each other and other aspects of the mobile communications network 100 and other networks either directly or indirectly.

The carrier will also operate a number of systems that provide ancillary functions in support of the communications services and/or application services provided through the network 100, and those elements communicate with other nodes or elements of the network 100 via one or more private IP type packet data networks 116 (sometimes referred to as an Intranet), i.e., a private networks. Generally, such systems are part of or connected for communication via the private network 116. It should be apparent, however, would recognize that systems outside of the private network could serve the same functions as well. Examples of such systems, in this case operated by the network service provider as part of the overall network 100, which communicate through the intranet type network 116, include one or more application servers 122 and an authentication server 120.

The application server 122 may include over-the-air provisioning server including a copy of the content media editing application in its database. The content media editing application may be downloaded to the mobile devices 110 and 112 from the server 122. Alternatively, the content media editing application may be preloaded or preinstalled on the mobile devices 110 and 112. The content media editing application may be part of another application such as, for example, a messaging application (e.g., an e-mail application) or a YouTube application. Alternatively or additionally, the content media editing application may be a stand alone application interacting with other applications (e.g., the messaging application) on the mobile devices 110 and 112. In either case, the content media editing application may be used for editing the video content stored on the mobile devices 110 and 112.

The video content may be created by the mobile device 110 and 112 or may be created by another device and downloaded to the mobile devices 110 and 112. The download may be through the network 114 or through a physical connection with the mobile devices 110 and 112. An exemplary content media editing application is shown in FIG. 1 as an editing application 110a for the mobile device 110 and as an editing application 112a for the mobile device 112. The editing applications 110a and 112a are configured to respectively engage the users of the mobile devices 110 and 112 in the process that will allow the users to trim the video size and select the appropriate video length acceptable by the network 114 and/or the mobile devices 110 and 112. Specifically, the editing applications 110 and 112 may be configured to compare the size associated with the video content with the acceptable video content size and determine whether the size associated with the video content exceeds the acceptable media content size. Upon determining that the size associated with the video content exceeds the acceptable media content size, the editing applications 110a and 112a may be configured to respectively allow the user of the mobile devices 110 and 112 to trim the video content down to the acceptable media content size. In one example, as will be described in more detail with respect to FIG. 3, the editing applications 110a and 112a may respectively allow the users of the mobile devices 110a and 112a to graphically determine when the video content is trimmed down to the acceptable media content size for successful transmission over the network 114. That is, the editing applications 110a and 112 may allow the users to graphically pick a specific portion of the video that would be within the acceptable media content size for successful transmission over the network 114.

The authentication server 120 may be a Home Subscriber Server (HSS). The HSS 120 evolved from a Home Location Register (HLR). In 3GPP networks, and particularly in the LTE architecture (for 3G and 4G networks), the HSS 120 can be a database of user (subscriber) information, i.e., customer profiles. The user information may include account information, account status, user preferences, features subscribed to by the user, and user's current location. The account information may include information about the capability of the user's devices 110 and 112 and an identity of network with which the mobile devices 110 and 112 are registered. The account information may also include information about whether the user is connected to a Wi-Fi network. This may be gleaned from the network registration information or from the IP address assigned to the mobile devices 110 and 112. The IP address associated for the Wi-Fi connection may be different from the IP addresses associated with mobile communication network connection. The HSS 120 in the network 100 may provide the user profile to a Mobility Management Entity (MME) 124.

The MME 124 is a control-node for the LTE access-network, in that it can be a single point (or "node") within the network that integrates numerous core functions and control over network flow, load sharing, etc. It can be responsible for tracking, paging, and retransmission procedures to the mobile devices 110 and 112. The MME 124 can also be involved in the mobile devices' activation/deactivation of service flows (also known as bearers) and is also responsible for authenticating the mobile devices when it is roaming, by interacting with the HSS 120. The mobile devices 110 and 112 through the base station (or eNodeB in 4G network) 114a and MME 124 register and authenticate with the network 100. The MME 124 may also be in charge of monitoring network congestion. To this end, the MME 124 may alone or in communication with other internal or external servers, be configured to monitor the number of failed called attempts and successful call attempts and based on the difference between them determine the congestion level on the network 100.

The mobile devices 110 and 112 communicate over the air with a base station (eNodeB) 114a and through the traffic network 114 for various voice and data communications, e.g., through the Internet 134 with a server 132 and/or with application servers 122. If the mobile service carrier offers the media content editing service, the service may be hosted on a carrier-operated application server 122, for communication via the networks 114 and 116. Alternatively, the media content editing service may be provided by a separate entity (alone or through agreements with the carrier), in which case, the service may be hosted on an application server such as server 132 connected for communication via the networks 114 and 134. Servers such as 122 and 132 may provide a variety of common applications or service functions in support of or in addition to an application program running on the mobile devices 110 and 112. However, for purposes of further discussion, we will focus on functions thereof in support of the media content editing service. For a given service, including the media content editing service, an application program within the mobile device may be considered as a 'client' and the programming at 122 or 132 may be considered as the server application for the particular service.

To insure that the application service offered by server 122 is available to only authorized devices/users, the provider of the application service also deploys an authentication server 120. The authentication server 120 could be a separate physical server as shown, or the authentication server 120 could be implemented as another program module running on the same hardware platform as the server application 122. Essentially, when the server application (server 122 in our example) receives a service request from a client application on a mobile device 110, for example, the server application provides appropriate information to the authentication server 120 to allow server application 122 to authenticate the mobile device 110 as outlined herein. Upon successful authentication, the server 120 informs the server application 122, which in turn provides access to the service via data communication through the various communication elements (e.g. 114, 114a, and 116) of the network 100. A similar authentication function may be provided for media content editing service(s) offered via the server 132, either by the server 120 if there is an appropriate arrangement between the carrier and the operator of server 132, by a program on the server 132 or via a separate authentication server (not shown) connected to the Internet 134.

Figure 2:
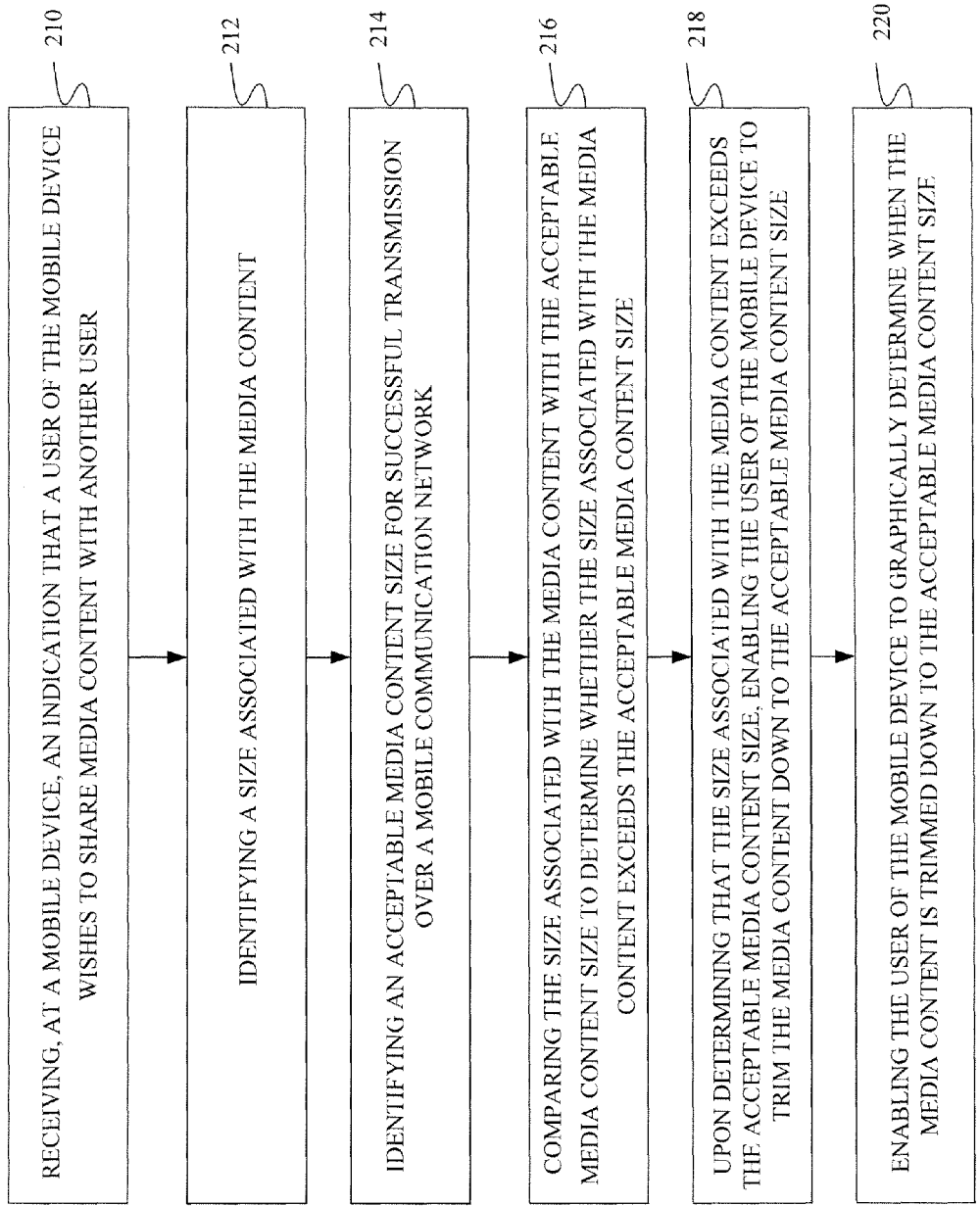
FIG. 2 illustrates an exemplary process for allowing a user of a mobile device to reduce the size of the video content to an acceptable video content size.

FIG. 2 illustrates an exemplary process 200 for allowing a user of the mobile device to reduce the size of the video content down to an acceptable video content size. The process 200 begins with the media content editing application (e.g., the editing application 110a) receiving an indication that a user of the mobile device 110 wishes to share media content with another user (Step 210). The other user may, for example, include the user of the mobile device 112. The editing application 110a may determine this information when the user of the mobile device 110 attempts to attach the video content to a specific application for sharing with another user. For example, the editing application 110a determines that the user of the mobile device 110 wishes to share the video content with another user when the user of the mobile device 110 attaches the video content to the messaging application (e.g., an e-mail application) on the mobile device 110. To this end, the editing application 110a may monitor specific applications (e.g., an e-mail application), which may be used for sharing video content to determine whether the specific application is being used to communicate video content over the communication network 114. In another implementation, the editing application 110a determines that the user of the mobile device 110 wishes to share the video content with another user when the user of the mobile device 110 selects the share icon associated with the video content. Specifically, the selection of the share icon may inform the editing application 110a of the user's intention for sharing video content with another user.

Responsive to such identification, the editing application 110a identifies the size associated with the video content (Step 212). The size associated with the video content may be determined based on the properties of the video content stored on the mobile device 110. The editing application 110a also identifies an acceptable media content size for successful transmission over the mobile communication network 114 (Step 214). The acceptable media content size may be determined based on the preset limit associated with the mobile device 110a, the preset limit associated with the specific application used for sharing video content, and/or the preset limit imposed by the network 114. In another example, the acceptable media content size may be based on the user's account. The user's account may include information about the type of account (e.g., standard or premium) and quality of service and bandwidth associated with the account. The acceptable media content size may be based on the quality of service and/or bandwidth associated with the account of the user. To this end, one user may be provided with one acceptable media content size and another user may be associated with another acceptable media content size depending on the account of each user. In one specific example, the maximum acceptable media content size may be 10 MB and the minimum acceptable media content size may be 100 KB depending on the network and network congestion. For example, the 3G network may have a lower acceptable media content size than the Wi-Fi network. Furthermore, once the acceptable media content size is determined, it may be changed depending on the network congestion. For example, if it is determined the network is congested above 80 percent utilization, the acceptable media content size may be reduced by a certain percentage.

The acceptable media content size may be based on any of the previously listed criteria or a combination thereof. If based on the combination, the acceptable media content size may be set to the minimum of the three different sizes imposed by the device, the application, and the network.

The mobile device 110 may be configured with a specific media content limit depending on its type. For example, the more advanced mobile devices such as Android or iPhones may have a higher acceptable media content size limit for successful sharing of video content across the network 114 than the less advanced mobile devices. The specific application used for sharing the video content also may be configured to a specific acceptable media content size limit. For example, the e-mail application for sharing video content may impose one acceptable media content size limit and a YouTube application for sharing video content may impose another acceptable media content size limit.

In another implementation, the acceptable media content size may be determined based on the restriction imposed by the type of network 114 connected to the mobile device 110. For example, a 3G network may impose one acceptable media content size limit for successful transmission of the video content and a 4G network may impose another acceptable media content size limit. Similarly, a connection to a Wi-Fi network may provide its own specific acceptable media content size limit. The information regarding the type of network 114 connected to the device 110 may be gleaned from the HSS 120 as described above with respect to FIG. 1.

When considering the restriction imposed on the acceptable media content size imposed by the network 114, network congestion may also be considered. The MME 124 may be in charge of monitoring network congestion. The MME 124 may alone or in communication with other internal or external servers be configured to monitor the number of failed data connection request attempts and successful data connection request attempts and, based on the difference between them, determine the congestion level on the network 100. The acceptable media content size imposed by the network 114 for successful transmission may change from time to time. In one implementation, the editing application 110a may determine the acceptable media content size imposed by the network 114 by sending a query to the mobile communication network 114 to determine an acceptable media content limit. The MME 124 may receive the request and provide the response to the editing application 110a based on the type of the network 114 connected to the device 110 and the network congestion at the time of inquiry. The editing application 110a receives the response from the MME 124 and sets the acceptable media content size accordingly. If no response is received from the MME 124, the editing application 110a may use the last known value for the acceptable media content size or a default value based on non-network limitations.

The editing application 110a may dynamically change the acceptable media content size in response to the change of the type of application used to share the video content, the change of the type of network 114 connected to the device 110, and/or the change of congestion in the network 114. The change in the type of network 114 connected to the device 110 or the congestion level in the network 114 may be communicated to the editing application 110a periodically or substantially simultaneously with the change. In certain cases, such information is provided to the editing application 110a only when the editing application 110a makes such a request and before sending the content to the network 114.

The network element (e.g., MME 124) may inform the editing application 110a of the network acceptable media content size change on its own initiative or the editing application 110a may query the network 114 for such information. For example, the editing application 110a may query the network 114 each time the user attempts to share video content with another user across the network 114. Alternatively, the editing application 110a may query the network 114 only if a preset time limit has lapsed since the last time it queried the network 114 for such information. For example, upon identifying the network acceptable media content size as five (5) MB, the editing application 110a may use this limit for a preset time limit (e.g., 1 hour). Therefore, if within the following hour, the user wishes to share additional video content, the editing application 110a will use the five (5) MB as the network acceptable media content size. However, if the user wishes to share additional video content after the expiration of the initial one hour limitation, the editing application 110a may again query the MME 124 for an updated network acceptable media content size.

Moving forward, upon identifying the video content size and the acceptable media content size for successful transmission of the video content over the network 114, the editing application 110a compares them to determine whether the size associated with the video content exceeds the acceptable media content size (Step 216). In one implementation, the editing application 110a may only check with the network 114 if the video content size exceeds a specific minimum threshold value. The specific minimum threshold value may be set based on a maximum content size allowed by the network 114 under the worst network conditions. The specific minimum threshold value may be 2 MB, for example. If the video content size exceeds the specific minimum threshold, the editing application 110a then checks with the network 114 to identify the acceptable media content size for successful transmission of the video content over the network 114. Upon identifying the acceptable media content size for successful transmission of the video content, the editing application 110a compares them to determine whether the size associated with the video content exceeds the acceptable media content size (Step 216).

If the editing application 110a determines that the video content size does not exceed the acceptable media content size, the editing application 110a allows the user to share the video content without reducing its size. However, upon determining that the video content size exceeds the acceptable media content size, the editing application 110a allows the user of the mobile device 110 to reduce the size of the video content to the acceptable media content size (Step 218). Specifically, the editing application 110a allows the user of the mobile device 110 to graphically determine when the video content has been reduced to an acceptable media content size (Step 220). In one specific example, the editing application 110a presents a user interface to the user of the mobile device 110, which allows the user to graphically reduce the video content to the acceptable media content size. The user interface contains a video player and a video editor for editing the media content.

Figure 3:
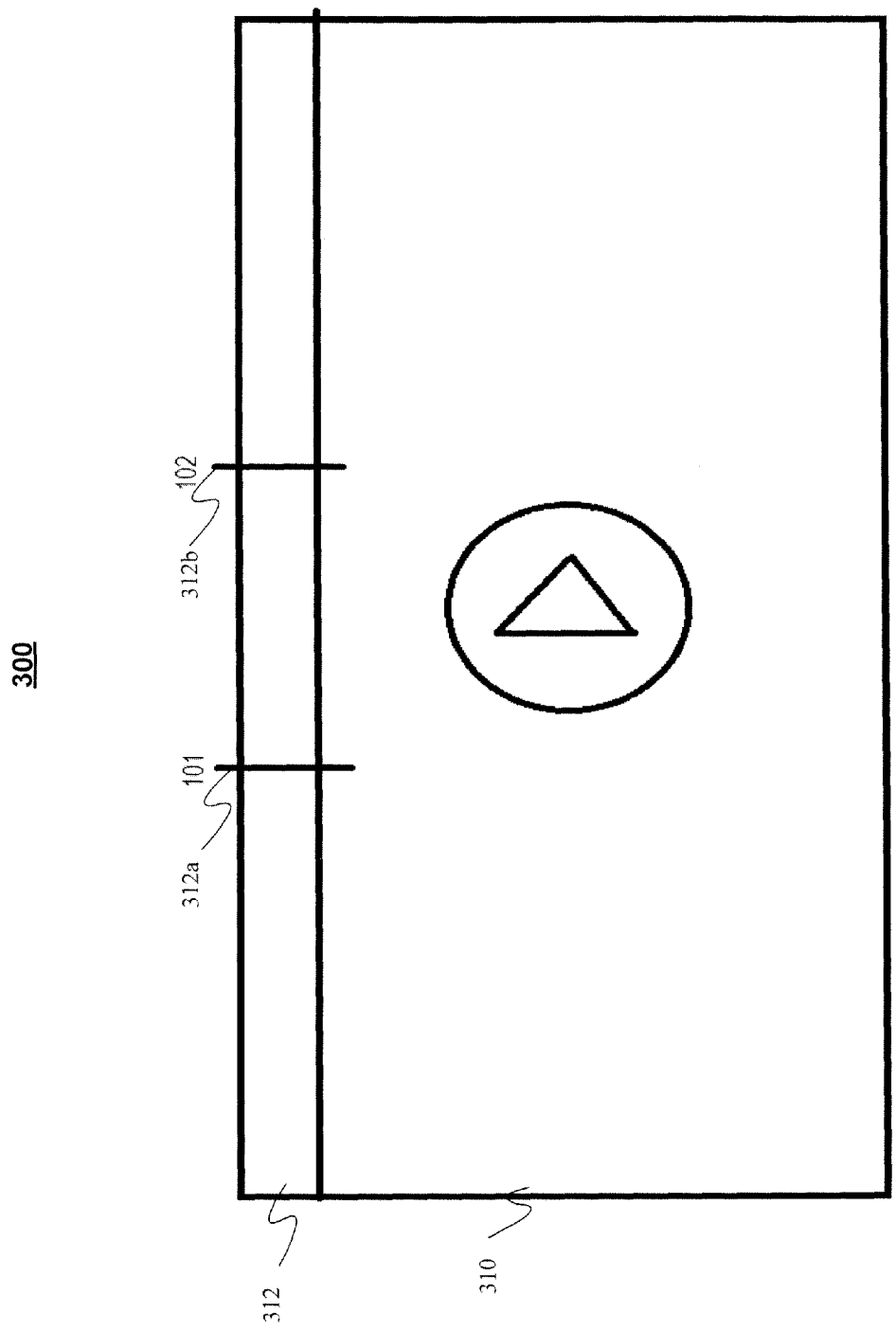
FIG. 3 illustrates an exemplary user interface configured to allow a user of a mobile device to reduce the size of the video content to an acceptable media content size for successful transmission over the network shown in FIG. 1.

FIG. 3 illustrates an exemplary user interface 300 configured to allow the user of the mobile device to reduce the size of the video content to an acceptable media content size for successful transmission over the network 114. The user interface 300 includes a video player 310 and a video editor 312. The video player 310 is configured to play the video content and the video editor 312 is configured to edit the video content. The editing of the video content may include trimming down the video content to an acceptable video content size. To this end, the video editor includes a first wire frame 312a and a second wire frame 312b. The first wire frame 312a allows the user to mark a starting portion of the edited video content. The second wire frame 312b allows the user to mark an ending portion of the edited video content. In one implementation, a gap between the first wire frame 312a and the second wire frame 312b does not exceed the acceptable media content size to prevent the user from selecting video content that is larger than the acceptable media content size. To this end, moving the first wire frame 312a to the left (or the second wire frame 312b to the right) to add more to the selected video content may not be allowed if the movement results in a gap between the first wire frame 312a and the second wire frame 312b larger than the acceptable media content size.

In one implementation, moving the first wire frame 312a to the left may not be allowed without impacting the second wire frame 312b. For example, moving the first wire frame 312a to the left may cause the second wire frame 312b to move in the same direction, preventing the user from picking a video portion that is larger than the acceptable media content size. In another example, the option of moving the first wire frame 312a to the left will be locked so that the user cannot select a section that is larger than the acceptable media content size. In yet another example, a color coded scheme may be used which will allow the user to move the first and second wire frames 312a and 312b freely but will change them to a specific color (e.g., red) to signal the user that the selection is larger than the acceptable media content size. Other color coded schemes also may be used. For example, a specific color (e.g., yellow) may be used to signal to the user that the selection is reaching the acceptable media content size. The specific color may change abruptly to another specific color (e.g., red) when the size of the selected content reaches the acceptable media content size or may slowly change from yellow to red as the size of the selected content increases. For another example, the color inside of the wire frame may be changed in addition or instead of the wire frame itself.

Instead of using the color coded scheme to signal the user that the selection is larger than the acceptable media content size, other schemes may be used. For example, such notification may be communicated to the user textually by presenting a balloon type notification around the first and second wire frames 312a and 312b or other part of user interface visible to the user. In yet another example, a running total may be calculated as the user moves the first and second wire frames 312a and 312b to select a specific portion of the video content. The running total may show the total size of the selected video content against the acceptable media content size. The running total may be displayed in MB content selected. Alternatively, the running total may be displayed in terms of allowable percentage of the acceptable media content size selected. In yet another implementation, several sets of wire frames each associated with a corresponding size notification may be used to select a specific video content. Each set may be used to select a specific portion of the video and may be given a specific size. The content size associated with all the sets of wire frames may not exceed the acceptable media content size set by the network 114. In yet another example, the user may be allowed to select portion a video content using the wire frames 310a and 310b and the editing application 110a does not inform the user whether the selection exceeds the threshold until after the user attempts to send the selected video content. If the selected video content exceeds the acceptable media content size, the editing application may display a message to the user indicating the same and requesting that the user further reduce the size of the selected portion of the video content.

The editing application 110a may compress the video content segment the user selected and then successfully send the compressed video content to its destination. Using such an algorithm can help in reducing failure condition and providing better service to the users.

The media content editing service under consideration here may be delivered to touchscreen type mobile devices as well as to non-touch type mobile devices. Hence, our simple example shows the mobile devices 110 and 112 as a touchscreen type mobile device. Also, as noted above, the media content editing service under consideration may be delivered to non-mobile devices such as personal computers. Implementation of the media content editing service will involve at least some execution of programming in the mobile devices, as well as implementation of user input/output functions and data communications through the network 114 from the mobile devices. It may be useful to consider the functional elements/aspects of two exemplary mobile devices 110, 112 at a high level.

Figure 4:
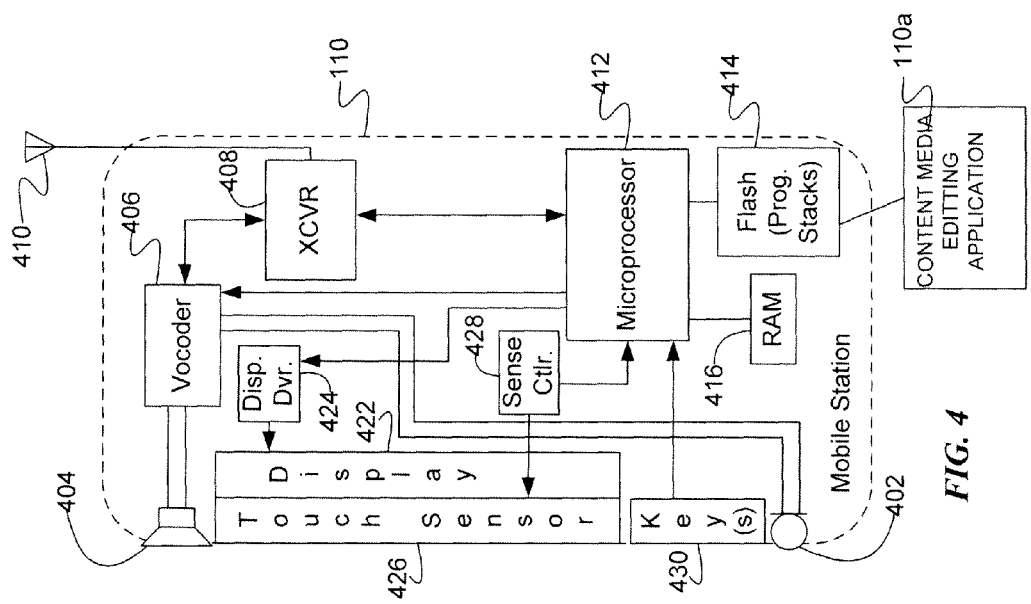
FIG. 4 is a block diagram illustration of the mobile device shown in FIG. 1.

For purposes of such a discussion, FIG. 4 provides a block diagram illustration of an exemplary touch type mobile device 110. Although the mobile device 110 may be a smartphone or may be incorporated into another device, such as a personal digital assistant (PDA) or the like, for discussion purposes the illustration shows the mobile device 110 in the form of a handset. The handset embodiment of the mobile device 110 functions as a normal digital wireless telephone station. For that function, the device 110 includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (Internet Protocol) communications.

For digital wireless communications, the device 110 also includes at least one digital transceiver (XCVR) 408. Today, the device 110 would be configured for digital wireless communications using one or more of the common network technology types. The concepts discussed here encompass embodiments of the mobile device 110 utilizing any digital transceivers that conform to current or future developed digital wireless communication standards. The mobile device 110 may also be capable of analog operation via a legacy network technology.

The transceiver 408 provides two-way wireless communication of information, such as vocoded speech samples and/or digital information, in accordance with the technology of the network 114. The transceiver 408 also sends and receives a variety of signaling messages in support of the various voice and data services provided via the mobile device 110 and the communication network. Each transceiver 408 connects through RF send and receive amplifiers (not separately shown) to an antenna 410. The transceiver may also support various types of mobile messaging services, such as short message service (SMS), enhanced messaging service (EMS) and/or multimedia messaging service (MMS).

The mobile device 110 includes a touchscreen display 426 for displaying messages, menus or the like, call-related information dialed by the user, calling-party numbers, etc., including the user interface 300 generated by the editing application 110a. The display 426 is a device that displays information to a user and can detect occurrence and location of a touch of an area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display. Hence, the exemplary mobile device 110 includes a display 422, which the microprocessor 412 controls via a display driver 424, to present visible outputs to the device user. The mobile device 110 also includes a touch/position sensor 426. The sensor 426 is relatively transparent, so that the user may view the information presented on the display 422. A sense circuit 428 senses signals from elements of the touch/position sensor 426 and detects occurrence and position of each touch of the screen formed by the display 422 and sensor 426. The sense circuit 428 provides touch position information to the microprocessor 412, which can correlate that information to the information currently displayed via the display 422 to determine the nature of user input via the screen.

The display 422 and touch sensor 426 (and possibly one or more keys 430, if included) are the physical elements providing the textual and graphical user interface for the mobile device 110. The microphone 402 and speaker 404 may be used as additional user interface elements, for audio input and output.

In addition to normal telephone and data communication related input/output (including message input and message display functions), the user interface elements also may be used for display of menus and other information to the user and for user input of selections, including any input needed selecting an appropriate video segment on the user interface 300. The microprocessor 412 serves as a programmable controller for the mobile device 110, in that it controls all operations of the mobile device 110 in accordance with programming that it executes, for all normal operations, and for operations involved in media content editing procedure under consideration here. In the example, the mobile device 110 includes flash type program memory 414, for storage of various "software" or "firmware" program routines and mobile configuration settings, such as mobile directory number (MDN) and/or mobile identification number (MIN), etc. The mobile device 110 may also include a non-volatile random access memory (RAM) 416 for a working data processing memory. Of course, other storage devices or configurations may be added to or substituted for those in the example. In a present implementation, the flash type program memory 414 stores firmware such as a boot routine, device driver software, an operating system, call processing software and vocoder control software, and any of a wide variety of other applications, such as client browser software and short message service software. The memories 414, 416 also store various data, such as telephone numbers and server addresses, downloaded data such as multimedia content, and various data input by the user. Programming stored in the flash type program memory 414, sometimes referred to as "firmware," is loaded into and executed by the microprocessor 412.

As outlined above, the mobile device 110 includes a processor, and programming stored in the flash memory 414 configures the processor so that the mobile device is capable of performing various desired functions, including in this case the functions involved in the technique for editing video content having a size larger than an acceptable video content size for successful transmission over the network 114.

In summary, the editing application is configured to automatically compare the size of the video content the user of the device wants to share with another user over the communication network to an acceptable media content size for successful transmission over a mobile communication network. If the size of the video content exceeds the acceptable media content size, the editing application allows the user of the mobile device to graphically trim the video content down to the acceptable media content size. To illustrate one specific example, the user may be at a soccer game for his/her son and takes a video of the entire game, which the user would like to share with the rest of his/her family. The size of the video content, however, may be much larger than the acceptable media content size for successful transmission over the network. In addition, the user may not wish to share the entire content with the family member and may only wish to focus their attention on a small segment of the video content where, for example, the son scores a goal. The editing application recognizes that the size of the video content is larger than the acceptable media content size and will allow the user to clip the video content to the maximum allowable size by presenting the user interface 300, for example, to the user.

As shown by the above discussion, functions relating to the content media editing service may be implemented on computers connected for data communication via the components of a packet data network, operating as the mobile device 110 and/or as the application server 122 shown in FIG. 1. Although special purpose devices may be used, such devices also may be implemented using one or more hardware platforms intended to represent a general class of data processing device commonly used to run "server" programming so as to implement the editing functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the content media editing. The software code is executable by the general-purpose computer that functions as the application server 122 and/or that functions as the mobile device 110. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for allowing the user to edit media content to an acceptable size for successful transmission over the network 114, in essentially the manner performed in the implementations discussed and illustrated herein.

Figures 5, 6:
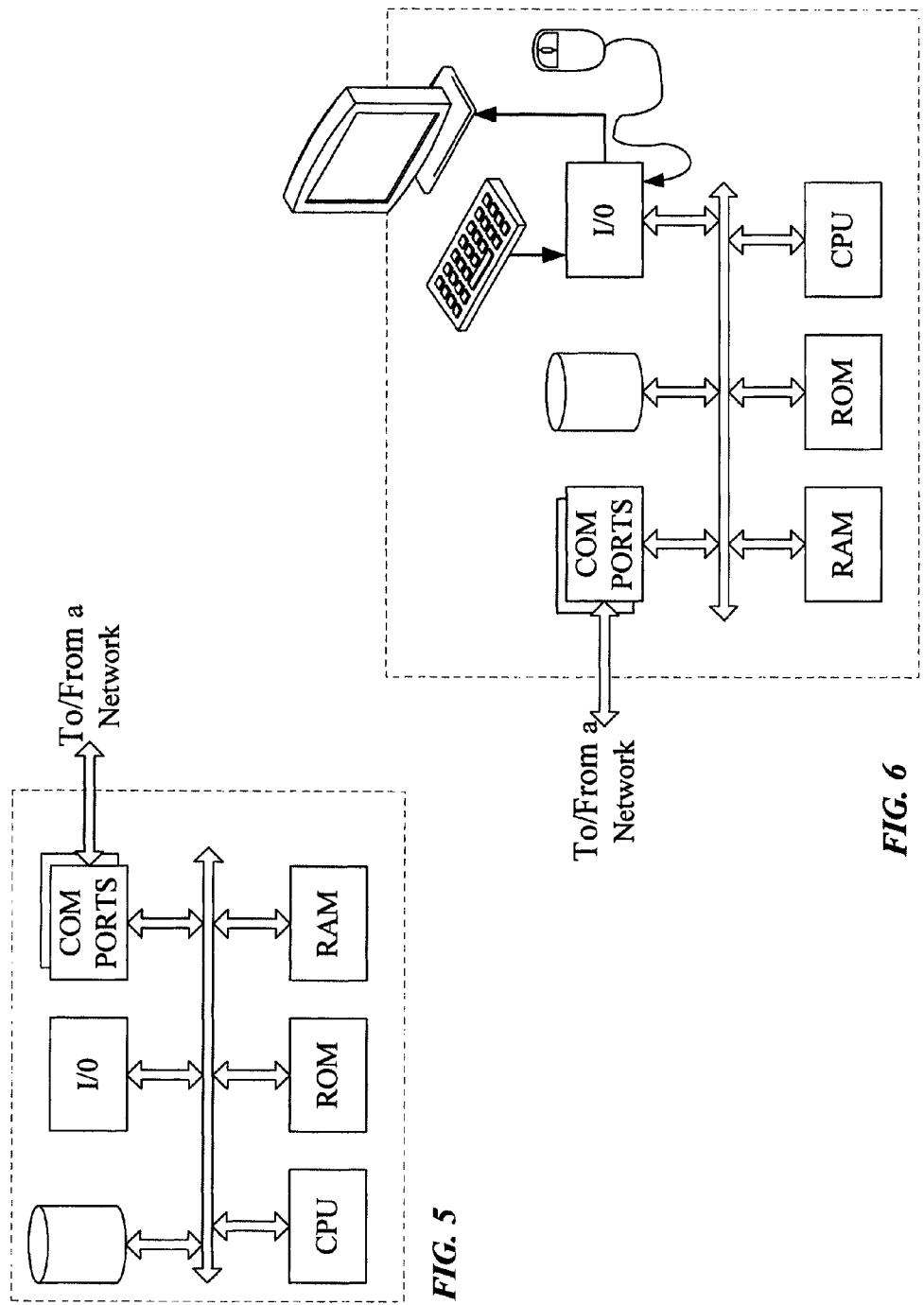
FIG. 5 illustrates a network or host computer platform, as may typically be used to implement a server.
FIG. 6 depicts a computer with user interface elements, as may be used to implement a personal computer or other type of workstation or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of allowing the user to reduce the size of the video content to an acceptable media content size outlined above may be embodied in programming. Program aspects of the technology may be thought of as "products" or "articles of manufacture" typically in the form of executable code and/or associated data that is carried on or embodied in a type of machine readable medium. "Storage" type media includes any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the application server 122 into the computer platform of the mobile device 110. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the functionality for reducing video content to an acceptable video content size for transmission over the network, etc. as shown in the drawings. Volatile storage media includes dynamic memory, such as main memory of such a computer platform. Tangible transmission media includes coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode(s) and/or other examples, it is understood that various modifications may be made therein and that the subject matter disclosed herein may be implemented in various forms and examples, and that the teachings may be applied in numerous applications, only some of which have been described herein. For example, the media content editing under consideration may be applied in a peer-to-peer transport confirmation and is not necessarily limited to a client-server transport configuration. For another example, the user interface shown in FIG. 3 may be displayed to the user after the user selects the send icon and the system recognizes that the video content that is being sent is larger that the acceptable media content size for successful transmission over the network. In this scenario, instead of display an error message to the user, the editing application 110*a* may display a message to the user indicating that the selected video content is larger than the acceptable media content size and presenting the user interface 300 to allow the user to reduce the size of the video content to the acceptable media content size.

It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a device, an indication that a user of the device wishes to share media content with another user;
identifying a size associated with the media content;
identifying an acceptable media content size for successful transmission over a communication network;
comparing the size associated with the media content with the acceptable media content size to determine whether the size associated with the media content exceeds the acceptable media content size; and
upon determining that the size associated with the media content exceeds the acceptable media content size, enabling the user of the device to reduce the size of the media content to the acceptable media content size; and
enabling the user of the device to graphically determine when the media content is reduced to the acceptable media content size, wherein enabling the user of the device to graphically determine when the media content is reduced to the acceptable media content size includes presenting a user interface to the user of the device, the user interface containing a video player and a video editor for editing the media content, and wherein the video editor includes a first wire frame enabling the user to mark a starting portion of an edited media content and a second wire frame enabling the user to mark an ending portion of the edited media content;
the method further comprising at least one of:
(i) preventing selection of media content that is larger than the acceptable media content size by limiting a gap between the first wire frame and the second wire frame to not exceed the acceptable media content size; and
(ii) changing a color of the first wire frame and/or the second wire frame when a gap between the first and second wire frame exceeds the acceptable media content size, thereby informing the user that the edited media content is larger than the acceptable media content size.

2. The method of claim 1, wherein the media content includes video content.

3. The method of claim 1, wherein the media content includes audio content.

4. The method of claim 1, wherein receiving the indication from the user includes receiving an indication that the media content is imported into a messaging client on the device for delivery over the communication network.

5. The method of claim 1, wherein identifying the acceptable media content size includes identifying an acceptable media content size limit based on a preset media content size configuration associated with the device and/or a messaging application on the device.

6. The method of claim 1, wherein identifying the acceptable media content size includes:
sending a query to the communication network to determine a maximum media content limit;
receiving a response from the communication network identifying the maximum media content limit; and
setting the acceptable media content size to the maximum media content limit.

7. The method of claim 6, further comprising dynamically changing the acceptable media content size in response to a change of maximum media content limit in the communication network.

8. The method of claim 1, further comprising transmitting the media content reduced in size to its destination.

9. A device comprising:
a processor; and
a memory storing executable instructions for causing the processor to:
receive an indication that a user of the device wishes to share media content with another user;
identify a size associated with the media content;
identify an acceptable media content size for successful transmission over a communication network;
compare the size associated with the media content with the acceptable media content size to determine whether the size associated with the media content exceeds the acceptable media content size; and
upon determining that the size associated with the media content exceeds the acceptable media content size, enable the user of the device to reduce the size of the media content to the acceptable media content size; and
enable the user of the device to graphically determine when the media content is reduced to the acceptable media content size, wherein to enable the user of the device to graphically determine when the media content is reduced to the acceptable media content size, the memory further stores executable instructions for causing the processor to present a user interface to the user of the device, the user interface containing a video player and a video editor for editing the media content, wherein the video editor includes a first wire frame enabling the user to mark a starting portion of an edited media content and a second wire frame enabling the user to mark an ending portion of the edited mediate content; and
wherein the memory further stores executable instructions for causing the processor to:
(i) prevent selection of media content that is larger than the acceptable media content size by limiting a gap between the first wire frame and the second wire frame to not exceed the acceptable media content size; or
(ii) change a color of the first wire frame and/or the second wire frame when a gap between the first and second wire frames exceeds the acceptable media content size, thereby informing the user edited media content is larger than the acceptable media content size.

10. The device of claim 9, wherein the media content includes video content.

11. The device of claim 9, wherein the media content includes audio content.

12. The device of claim 9, wherein to receive the indication from the user, the memory further stores executable instructions for causing the processor to receive an indication that the media content is imported into a messaging client on the device for delivery over the communication network.

13. The device of claim 9, wherein to identify the acceptable media content size, the memory further stores executable instructions for causing the processor to identify an acceptable media content size limit based on a preset media content size configuration associated with the device and/or a messaging application on the device.

14. The device of claim 9, wherein to identify the acceptable media content size, the memory further stores executable instructions for causing the processor to:
   send a query to the communication network to determine a maximum media content limit;
   receive a response from the communication network identifying the maximum media content limit; and
   set the acceptable media content size to the maximum media content limit.

15. The device of claim 14, wherein the memory further stores executable instructions for causing the processor to dynamically change the acceptable media content size in response to a change of maximum media content limit in the communication network.

16. The device of claim 9, wherein the memory further stores executable instructions for causing the processor to transmit the media content reduced in size to its destination.

* * * * *